April 7, 1931.                    N. H. CASLER                    1,799,501
                            VENTILATED BAMBOO POLE
                              Filed May 23, 1930
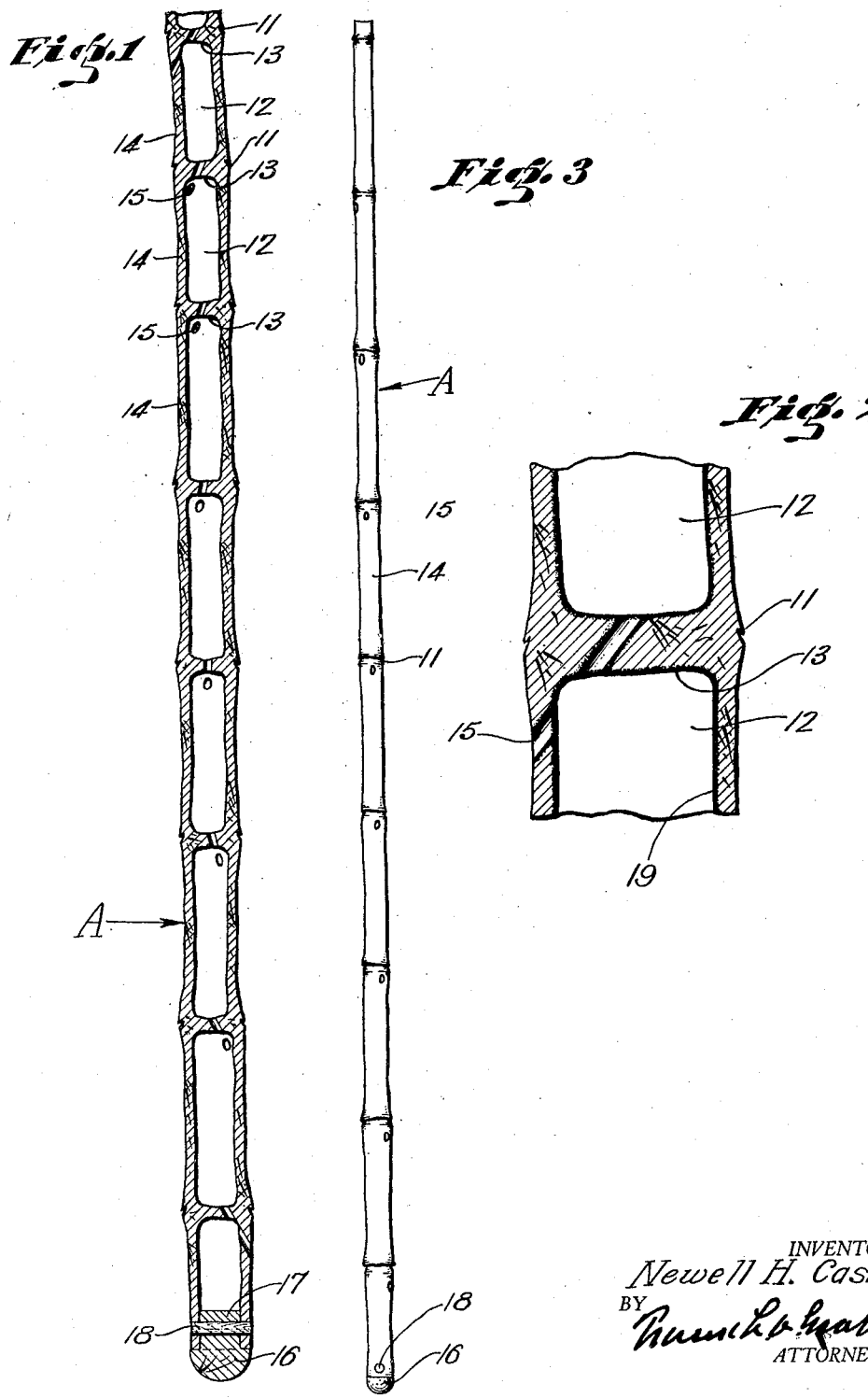
INVENTOR.
Newell H. Casler.
BY
                ATTORNEYS.

Patented Apr. 7, 1931

1,799,501

UNITED STATES PATENT OFFICE

NEWELL H. CASLER, OF MONTEREY PARK, CALIFORNIA, ASSIGNOR TO ALBERT K. GRAFTON, OF LOS ANGELES, CALIFORNIA

VENTILATED BAMBOO POLE

Application filed May 23, 1930. Serial No. 454,910.

This invention relates to bamboo poles such as are ordinarily used for fishing poles, vaulting poles, and the like.

Bamboo poles in their natural state are formed of a series of sections having nodes therebetween. The nodes contain a pithy partition dividing the pole into a series of isolated chambers. These chambers, during growth and curing of the pole will fill with a gas which will expand upon an increase in temperature and may actually burst the wall of the chamber. The result is that bamboo poles, when exposed to changes in temperature, will often develop cracks in the wall of the pole, and render the pole valueless. Perceiving that the loss of a great many poles was due to this fact, I conceived the idea of releasing the air entrapped in each section, and at the same time of intercommunicating the chambers so that the pole was vented interiorly from end to end, as well as having a vent to the atmosphere for each section of the pole. I do this by drilling a small hole of about ⅛ inch in diameter to penetrate the wall of the chamber in close proximity to the node, and angle the hole in a way that the drill will also penetrate the pithy partition in the node. This results not only in venting the chamber to the atmosphere, but also in interconnecting adjacent chambers. Furthermore, in order to avoid weakening of the pole, I prefer to drill the holes in offset relation around the pole. The holes may be drilled during the process of curing the poles, which would relieve any initial pressure of gas within the chamber during curing, and thus place the poles in good condition for changing temperatures, incidental to shipping, or the poles may be cured in their natural state and the holes drilled at any time to prevent cracking by the expansion of the entrapped gas.

Another advantage which may be derived by drilling holes in the wall of the pole results in making the interior of the pole available for waterproofing. In this respect, it is known that bamboo poles depend largely for their usefulness upon the rigidity and the strength of the pole. The rigidity and strength depend mainly upon the moisture content which resides in the wall of the pole; consequently, if the moisture content becomes too low, the pole would become too brittle. On the other hand, if the moisture content were too great, the pole would be too limber. By curing a pole to a proper moisture content, and then sealing the interior surface of the wall with a water-proof substance, a uniform moisture content would be maintained in the wall of the pole, since the outer surface of a bamboo pole is of such a nature that no moisture may enter or leave the pole through this surface.

Another advantage of venting the individual chambers to the atmosphere resides in the fact that an air circulation may be had through each section of the pole. This provides an improvement over a straight vent through the partition members, inasmuch as a straight vent without chamber vents results in a column of dead air entrapped in the pole, when either end of the pole is closed by a plug, such as is used on a vaulting pole, or a handle such as may be used on a fishing pole.

It is, therefore, an object of this invention to provide a bamboo pole with means for venting the chambers of the pole between the nodes to the atmosphere.

It is another object of this invention to provide a bamboo pole having vents through the partitioning member throughout the length of the pole.

It is a further object to provide a bamboo pole having a water-proofed interior.

Other objects and advantages will become apparent as the description proceeds in conjunction with the drawings, in which—

Fig. 1 is a vertical section of a part of a pole showing the manner of placing the holes;

Fig. 2 is an enlarged view showing a single node with a hole drilled in the manner contemplated by this invention; and Fig. 3 is an elevational view of a pole having holes drilled therein.

Referring to the drawings, and particularly to Fig. 1, I have shown a pole A. The pole A has the characteristic nodes 11 which form the pole into separate closed chambers 12 by means of a pithy partition member 13. It is obvious that the chambers 12 in their natural state will be filled up with a gas, either from the growth of the pole or from gases generated during the curing process. This gas will eventually expand under a rising temperature and exert an outward pressure sufficiently great to disrupt the wall 14 of the chambers 12. To prevent this, I drill holes 15 in the wall 14 of each chamber 12, and by drilling the holes in close proximity to the nodes 11 and directing the holes either upwardly or downwardly at an angle, I penetrate the partition 13. Thus, by a single drilling operation, I obtain two results. First, I interconnect the chambers 12, and, secondly, I vent each chamber to the atmosphere. It is thus clear that a vent is provided between the chambers, and may extend from the bottom section of the pole through the pole to the top of the pole. It is also apparent that each chamber is vented to the atmosphere and, consequently, no dead air spaces result. The holes 15 may also be used for spraying or otherwise applying a waterproofing solution, as shown to 19, to the interior of the pole.

As shown in Fig. 1, I have illustrated a tip consisting of a rounded member 16 inserted in the lower end of the pole A, which tip is a conventional member used on the end of a vaulting pole. The means of attaching the member 16 to the pole consists of a reduced shank 17, which extends into the end of the chamber 12, and is secured thereto by a pin 18 extending through the wall 14 of the chamber 12 and the shank 17 of the member 16. The pin 18 is preferably of wood, and ordinarily is held in place by gluing. The member 16 is also preferably glued in place.

Although I have directed this description toward a bamboo pole for use mainly as a vaulting or fishing pole, nevertheless, I intend this disclosure to be applicable to all bamboo poles having nodes dividing the poles into isolated chambers of the nature described.

I claim as my invention:

1. A bamboo pole having a longitudinal air passage therethrough.

2. In a bamboo pole: means for venting the interior of the pole to the atmosphere.

3. In a bamboo pole having nodes forming separate closed chambers: means for individually venting said chambers to the atmosphere.

4. In a bamboo pole having nodes forming separate closed chambers: means for individually venting said chambers to the atmosphere; and means for interconnecting said chambers.

5. A bamboo pole having a hole through the wall thereof in close proximity to each node in the pole.

6. A bamboo pole having a hole through the wall thereof in close proximity to each node in the pole, said holes being drilled in a manner to penetrate both the wall of the pole and the pithy partition of the node.

7. A bamboo pole having a hole near each node in the pole, said holes being circumferentially spaced about the pole and drilled in a manner to penetrate both the wall of the pole and the pithy partition of the node.

8. A bamboo pole having a water-proofing substance covering the interior surface of the pole.

9. A bamboo pole composed of nodes forming separate chambers and having an air passage through each node and through the wall of the pole to each chamber.

In testimony whereof, I have hereunto set my hand at Los Angeles, California, this 17th day of May, 1930.

NEWELL H. CASLER.